Sept. 19, 1950  J. E. REILLY  2,523,141
SYNCHRONOUS CONDENSER PROTECTIVE SYSTEM
Filed Jan. 9, 1947
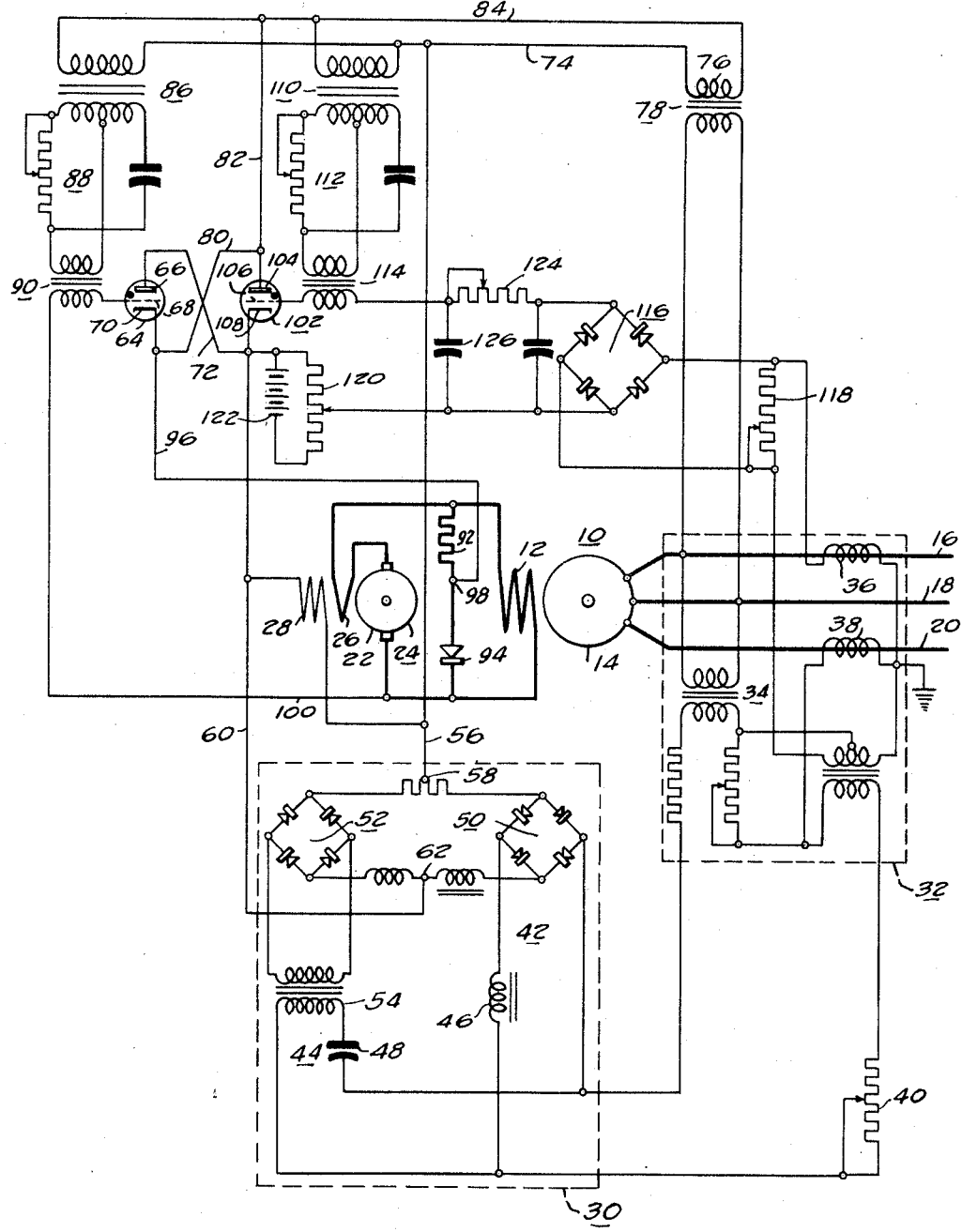
WITNESSES:
E. A. McCloskey
Wm. L. Groome
INVENTOR
Jack E. Reilly.
BY
James N. Ely
ATTORNEY Patented Sept. 19, 1950

2,523,141

UNITED STATES PATENT OFFICE 2,523,141

SYNCHRONOUS CONDENSER PROTECTIVE SYSTEM

Jack E. Reilly, Pittsburgh, Pa., assignor to Westinghouse Electric Corporation, East Pittsburgh, Pa., a corporation of Pennsylvania Application January 9, 1947, Serial No. 721,077

5 Claims. (Cl. 323—107)

1

This invention relates to regulating systems.

An object of this invention is to provide, in a regulating system for a synchronous condenser, for modifying the operation of the regulating system when the condenser current reaches the predetermined rated value of the condenser to thereby limit the excitation of the condenser and maintain the current thereof at not more than its rated value.

Another object of this invention is to provide, in a regulating system for a synchronous condenser, means responsive to the condenser current to modify the operation of the regulator in controlling the excitation of the condenser to maintain the current thereof at not more than the rated value of the condenser.

A further object of this invention is to provide, in a regulating system for a synchronous condenser having means for modifying the operation of the regulator to control the excitation of the condenser to maintain the current thereof at not more than the rated value of the condenser, for a time delay in the operation of the modifying means.

Other objects of this invention will become apparent from the following description when taken in conjunction with the accompanying drawing, the single figure of which is a diagrammatic view of a regulating system embodying the teachings of this invention.

Referring to the drawing, there is illustrated a synchronous condenser 10 having a field winding 12 and an armature 14 connected to load conductors 16, 18 and 20. The field winding 12 of the condenser 10 is connected across the armature 22 of an exciter generator 24 disposed to control the excitation of the field winding 12. In this instance the exciter generator 24 is illustrated as being of the self-excited type being provided with a series tuned field winding 26 and a control field winding 28.

The control field winding 28 is disposed to be normally deenergized when normal line voltage is present across the load conductors 16, 18 and 20 and to be directionally energized as the line voltage departs (raises or lowers) from normal to control or excite the exciter generator 24 to regulate the excitation of the condenser 10 to correct for such departure. Thus the control field winding 28 is connected through a voltage reference network 30 to be supplied by the line voltage, a network 32 being utilized to derive a positive sequence component of the line voltage for supplying or exciting the field winding 28 in accordance with a measure of the line voltage.

2

The network 32 comprises the potential transformer 34 for deriving a single phase of the three-phase line voltage having no zero-sequence voltage-component and current transformers 36 and 38 which cause line current to pass through the impedance in the network in such a manner as to produce a voltage drop substantially corresponding to the negative-sequence line voltage, and the voltage drop thus resulting is subtracted from the single phase of the line voltage to produce substantially the positive-sequence component of the line voltage. Reference may be had to the copending application of E. L. Harder, Serial No. 560,299 filed October 25, 1944, now Patent No. 2,426,016, issued August 19, 1947, for a more complete description of the network 32 and for different embodiments thereof which may be utilized instead of the specific network 32 shown herein.

The voltage reference network 30 is connected to be supplied from the network 32 through an adjustable resistor 40 which provides a voltage adjusting means. As illustrated, the network 30 comprises a non-linear impedance circuit 42 and a linear impedance circuit 44 connected to be simultaneously energized in accordance with the line voltage and, in particular, by the positive sequence component of the line voltage. The non-linear impedance circuit includes a saturating reactor 46, whereas the linear impedance circuit 44 includes a capacitor 48. The non-linear impedance circuit 42 and the linear impedance circuit 44 are connected across the input terminals of dry-type rectifying units 50 and 52, respectively, an insulating transformer 54 being connected between the capacitor 48 and the rectifying unit 52. The output terminals of the rectifying units 50 and 52 are connected in series circuit relation with one another through suitable resistors and series-connected smoothing reactors.

Thus, the network 30 has two circuits which have intersecting impedance characteristics so that as the line voltage varies from normal, such as for a raise in voltage, the saturating reactor 46 draws more current, and at lower voltages the capacitor 48 draws more current. By connecting one end of the control field winding 28 of the regulating exciter generator 24 through conductor 56 to the tap 58 of the direct-current series circuit connecting the rectifying units 50 and 52, and the other end of the control field winding 28 by conductor 60 to tap 62 of the series output circuit of the rectifying units, directional energization of the control field winding 28 may be obtained as the line voltage departs from a normal value.

As is apparent, the excitation of the condenser 10 is dependent upon the directional energization of the control field winding 28. For example, if the potential across rectifying unit 50 is large compared with the potential across rectifying unit 52, current flows from tap 62 of the voltage reference circuit 30 through conductor 60, field winding 28 and conductor 56 to tap 58 of the reference circuit 30 to energize the field winding 28 and effect an action in opposition to the action of the series field winding 26 to decrease the excitation of the regulating exciter generator 24. As the output of the regulating generator 24 is decreased, the excitation of the condenser 10 is also decreased, and if such excitation effect is continued, it is possible for the excitation of the condenser to pass through zero and to reverse.

For this reason and to limit the supply of lagging current from the condenser, a control circuit is provided for limiting the energization of the control field winding 28 in the direction to produce an action in opposition with the action of the series field winding 26 to thereby limit the decrease in the output of the regulating exciter generator 24 and consequently limit the lowering of the excitation of the condenser 10 below a predetermined value. Thus a gaseous electric discharge valve 64 is connected in circuit with the control field winding 28 for effecting flow of current therein under predetermined operating conditions in opposition to the flow of current which produces the opposing action just described.

The discharge valve 64 is provided with an anode 66, a grid 68 and a cathode 70. The anode 66 is connected through conductors 72 and 60, field winding 28, conductor 56 and conductor 74 to one end of the secondary winding 76 of a transformer 78, the primary winding of which is connected across line conductors 16 and 18. The cathode 70 is connected through conductors 80, 82 and 84 to the other end of the secondary winding 76 of transformer 78.

The bias of grid 68 of valve 64 is controlled in accordance with the excitation of the synchronous condenser 10. An alternating current potential is normally supplied to the grid 68 from the source of supply represented by conductors 74 and 84, the potential being supplied through a transformer 86, the phase shifting circuit 88 and the grid transformer 90. The discharge valve 64 is of the well known thyratron type, the conductivity thereof being controlled by the grid-cathode potential superimposed on a direct-current biasing potential so that the resultant grid-cathode potential becomes more positive than the critical grid potential of the discharge valve to render the valve conductive. Thus control of the conductivity of the valve 64 is obtained by varying the direct-current biasing potential.

In this instance, a measuring circuit is employed for providing the direct-current biasing potential. The measuring circuit consists of a series connected resistor 92 and a dry type rectifier 94 connected across the output terminals of the exciter generator 24, the cathode 70 being connected by conductor 96 to the tap 98 at one end of the rectifier 94, the other end of the rectifier 94 being connected by conductor 100 through the secondary winding of the grid transformer 90 to the grid 68. Thus the actual direct-current grid potential is a measure of the potential drop across the rectifier 94.

As the output voltage of the regulating exciter generator 24 rises above a predetermined value, the resistance of the rectifier 94 decreases abnormally and since the direct-current grid potential of valve 64 is actually the potential drop across the rectifier 94, the direct-current grid potential is limited to a safe value for the valve. As the voltage output of exciter generator 24 decreases towards a predetermined minimum voltage output, the potential drop across rectifier 94 will be nearly equal to the voltage across the exciter 24 since the resistance of the rectifier increases abnormally with such decrease in the voltage output of the exciter generator 24. Thus the firing of the valve 64 is dependent upon the output of the regulating generator 24 for as the voltage output thereof decreases to a predetermined minimum value, the direct-current grid potential is decreased so that it becomes less negative and permits the phase shifted alternating-current potential as supplied by the grid transformer 90 to cut the critical grid potential of the valve 64 whereupon the valve begins to conduct and to pass current to the control field winding 28.

While the regulating equipment described hereinbefore is satisfactory for most regulating operations, it is sometimes necessary to limit the condenser current to a maximum value as specified by the manufacturer of the condenser. For this reason another gaseous discharge valve 102 is connected in circuit with the field winding 28 to provide a current limiting action. The valve 102 is similar to valve 70 having an anode 104, a grid 106 and a cathode 108 and being grid controlled in response to the condenser current. The anode 104 is connected by conductor 82 to conductor 84, whereas the cathode 108 is connected through conductor 60, control field winding 28 and conductor 56 to conductor 74.

An alternating-current potential is normally supplied to the grid 106 from the source of supply represented by conductors 74 and 84, the potential being supplied through a transformer 110, the phase shifting circuit 112 and the grid transformer 114. In this instance, a variable direct-current bias and a fixed direct-current bias are utilized for controlling the firing of the valve 102. The variable direct-current component of the grid voltage is impressed on the grid-cathode circuit of valve 102 from a full wave dry type rectifier 116, the input terminals of which are connected across the current transformer 36, a variable resistor 118 being connected across the input to the rectifier 116 for control purposes. The fixed direct-current bias is derived from the potential drop across a variable resistor 120 which is connected in the grid-cathode circuit and across a source of direct-current represented by the battery 122.

In practice, the resistor 120 is adjusted so that for all values of the variable direct-current bias applied to the grid-cathode circuit from the rectifier 116, which variable direct-current voltage is proportional to the current from the condenser 10, up to the maximum rated current from the condenser, a blocking bias is applied to the grid 106 to maintain the valve 102 non-conducting. When the condenser current exceeds the rated value, the variable direct-current grid potential then so offsets the fixed direct-current bias from resistor 120 that the resulting direct-current bias is decreased and becomes less negative and permits the phase shifted alternating-current potential as supplied by the grid transformer 114 to cut the critical grid potential of the valve 102 whereupon the valve 102 is rendered conducting to pass current.

Under certain fault conditions, it is sometimes desirable to provide a time delay in the firing of the valve 102. For example, if the power system represented by conductors 16, 18 and 20 to which the condenser 10 is connected is subjected to a fault condition so that the condenser 10 is required to supply a maximum leading current in an attempt to maintain line voltage it is often desired to permit the condenser to supply the maximum amount of leading current for a short period of time in case the fault condition is of short duration before the current supplied by the condenser is limited to a safe value.

For this reason, a variable or adjustable resistor 124 is connected in series between the rectifier 116 and the grid 106 of valve 102 and a capacitor 126 is connected across the output of the rectifier 116 to cooperate with resistor 124 to provide a suitable time delay. The resistor-capacitor circuit will operate in a well-known manner, in that as the current supplied by the synchronous condenser 10 increases, a larger voltage proportional to such current will appear across the output terminals of rectifier 116 and will be impressed on the resistor-capacitor circuit with the result that the voltage across capacitor 126 will build up to a value necessary to bias valve 102 to render it conducting in a period of time which is dependent upon the adjustment of the adjustable resistor 124.

In operation, with the elements of the system as shown, the regulating exciter generator 24 is self-excited by reason of the series field winding 26 to maintain the condenser 10 sufficiently excited to maintain a predetermined voltage across conductors 16, 18 and 20 under given load conditions. If the load conditions should change so as to effect an increase in the voltage across the conductors 16, 18 and 20, then the system operates to control the excitation of the condenser 10 to control the lagging current of the condenser to effect the return of the line voltage to the initial predetermined value.

Under such conditions of an increase in the line voltage, the voltage reference network 30 becomes unbalanced with the result that control field winding 28 is energized to effect an action in opposition to the action of the series field winding 26 to decrease the output of the exciter generator 24. The resulting decrease in the excitation of the condenser 10 to prevent excessive heating thereof, the valve 64 is rendered conducting to prevent any further decrease in the excitation of the regulating generator 24. Thus the rectifier 94 is so selected that its resistance is of a value at the predetermined minimum voltage, that the potential drop across the rectifier 94 is substantially equal to the output voltage of the generator 24. The direct-current grid potential of valve 64 is thus so decreased and becomes less negative that valve 64 becomes conducting and current flows from conductor 74 through conductor 56, control field winding 28, conductors 60 and 72, anode 66, cathode 70 and conductors 80 and 82 to conductor 84. The current thus passed by valve 64 flows through the control field winding 28 in opposition to the flow of current from the network 30 to decrease the action of the control field winding 28 in opposition to the action of the series field winding 26 to maintain the excitation of the regulating generator 24 at a value sufficient to insure the output of the predetermined minimum voltage required for preventing further lowering of the excitation of the synchronous condenser 10.

If the load should change so that the voltage across conductors 16, 18 and 20 should decrease from the predetermined value which is to be maintained, then the voltage reference network 30 becomes unbalanced as the capacitor 48 draws more current than the reactor 46 and the tap 58 becomes more positive than the tap 62. Current thus flows from the tap 58 through conductor 56, control field winding 28 and conductor 60 to tap 62 to energize the control field winding 28 and effect an action to aid the action of the series field winding 26 to increase the excitation of the regulating generator 24 and thereby increase the excitation of the synchronous condenser 10 and return the voltage across conductors 16, 18 and 20 to the predetermined value which is to be maintained.

As stated hereinbefore, it is desired to provide for limiting the condenser current to its rated value. Thus although the unbalance of the network 30 may call for energizing the control field winding 28 to aid the series field winding 26 as just described in increasing the excitation of the exciter generator 24 and consequently that of the synchronous condenser 10, as the condenser current increases to and exceeds its rated value, the variable direct-current potential as measured across the output terminals of rectifier 116 increases to overcome the fixed direct-current potential across resistor 120 and the direct-current grid bias of valve 102 becomes less negative to render the valve 102 conducting. Where the resistor-capacitor circuit formed of the resistor 124 and condenser 126 is included in the grid-cathode circuit, a time delay action is obtained in the firing of valve 102 as described hereinbefore.

When valve 102 is rendered conducting, current flows from conductor 84 through conductor 82, anode 104, cathode 108, conductor 60, control field winding 28 and conductor 56 to conductor 74 in opposition to the flow of current from the network 30. Such current flow through the valve 102 and the control field winding 28 functions to decrease the action of the control field winding 28 to aid the series field winding 26 whereby the net excitation of the regulating exciter generator 24 is, in effect, reduced to prevent the increasing of the excitation of the condenser 10 beyond the value necessary to maintain the condenser current at not over its rated value.

The valve 102 and the measuring circuit associated therewith cooperate effectively with the regulating generator 24 and associated control to provide an efficient and effective current limiting circuit for the synchronous condenser. When taken in conjunction with the regulating equipment described, complete control of the operation of the condenser can be obtained, safeguards being provided to limit not only the permissible decrease in the excitation of the synchronous condenser but also to limit the condenser current to not over its rated value. The apparatus utilized is of standard construction and can be readily duplicated.

In the copending application Serial No. 721,075 of J. E. Reilly, which was filed simultaneously with this application and is now Patent No. 2,495,182, issued January 17, 1950, the regulating system disclosed herein for limiting the permissible decrease in the excitation of the synchronous condenser is specifically disclosed and claimed. Such regulating system is not claimed per se

I claim as my invention:

1. In a regulating system for maintaining an electrical condition of a predetermined value on a power line having a synchronous condenser of a predetermined rated current value connected thereto, in combination, means disposed to be operated to control the excitation of the synchronous condenser, means disposed to be energized to control the operation of the control means, means for directionally controlling the energization of the energizable means in accordance with the departure of the electrical condition on the power line from said predetermined value, an electric discharge valve means disposed to be rendered conducting to connect the energizable means to a source of energy, means connected to the control means to be responsive to the operation of the control means to provide a source of direct-current biasing potential dependent upon the operation of the control means to render the electric discharge valve means conducting under predetermined operating conditions of the control means to prevent a decrease in the excitation of the synchronous condenser below a predetermined minimum value, and another electric discharge valve means disposed to be operated in response to the condenser current at the predetermined rated value to modify the energization of the energizable means to effect a decrease in the excitation of the synchronous condenser to maintain the condenser current at not more than the predetermined rated value.

2. In a regulating system for maintaining an electrical condition of a predetermined value on a power line having a synchronous condenser of a predetermined rated current value connected thereto, in combination, means disposed to be operated to control the excitation of the synchronous condenser, means disposed to be energized to control the operation of the control means, means for directionally controlling the energization of the energizable means in accordance with the departure of the electrical condition on the power line from said predetermined value, a pair of electric discharge valves disposed to be selectively rendered conducting to connnect the energizable means to a source of energy, means connected to the control means to provide a source of direct-current biasing potential dependent upon the operation of the control means to render one of said pair of valves conducting under predetermined operating conditions of the control means to effect the energization of the energizable means in a predetermined manner to prevent a decrease in the excitation of the synchronous condenser below a predetermined value, and means connected to the power line to provide a source of direct-current biasing potential for the other of said pair of valves dependent upon the condenser current to render said other valve conducting when the condenser current reaches its predetermined rated value to modify the energization of the energizable means to effect a decrease in the excitation of the synchronous condenser to maintain the condenser current at not more than the predetermined rated value.

3. In a regulating system for maintaining an electrical condition of a predetermined value on a power line having a synchronous condenser of a predetermined rated current value connected thereto, in combination, means disposed to be operated to control the excitation of the synchronous condenser, means disposed to be energized to control the operation of the control means, means for directionally controlling the energization of the energizable means in accordance with the departure of the electrical condition on the power line from said predetermined value, a pair of electric discharge valves disposed to be selectively rendered conducting to connect the energizable means to a source of energy, means connected to the control means to provide a source of direct-current biasing potential dependent upon the operation of the control means to render one of said pair of valves conducting under predetermined operating conditions of the control means to effect the energization of the energizable means in a predetermined manner to prevent a decrease in the excitation of the synchronous condenser below a predetermined value, and a full-wave rectifier connected in circuit relation with the power line to provide a source of direct-current biasing potential for the other of said pair of valves dependent upon the condenser current to render said other valve conducting when the condenser current reaches its predetermined rated value to modify the energization of the energizable means to effect a decrease in the excitation of the synchronous condenser to maintain the condenser current at not more than the predetermined rated value.

4. In a regulating system for maintaining an electrical condition of a predetermined value on a power line having a synchronous condenser of a predetermined rated current value connected thereto, in combination, means disposed to be operated to control the excitation of the synchronous condenser, means disposed to be energized to control the operation of the control means, means for directionally controlling the energization of the energizable means in accordance with the departure of the electrical condition on the power line from said predetermined value, a pair of electric discharge valves disposed to be selectively rendered conducting to connect the energizable means to a source of energy, means connected to the control means to provide a source of direct-current biasing potential dependent upon the operation of the control means to render one of said pair of valves conducting under predetermined operating conditions of the control means to effect the energization of the energizable means in a predetermined manner to prevent a decrease in the excitation of the synchronous condenser below a predetermined value, means connected to the power line to provide a source of direct-current biasing potential for the other of said pair of valves dependent upon the condenser current to render said other valve conducting when the condenser current reaches its predetermined rated value to modify the energization of the energizable means to effect a decrease in the excitation of the synchronous condenser to maintain the condenser current at not more than the predetermined rated value, and time delay means connected in circuit relation between the source of direct-current biasing potential dependent upon the condenser current and the other of said pair of valves to effect a predetermined time delay when the condenser current reaches its said predetermined value before the other of said pair of valves is rendered conducting.

5. In a regulating system for maintaining an electrical condition of a predetermined value on a power line having a synchronous condenser of a predetermined rated current value connected thereto, in combination, means disposed to be operated to control the excitation of the synchronous condenser, means disposed to be energized to control the operation of the control means, means for directionally controlling the energization of the energizable means in accordance with the departure of the electrical condition on the power line from said predetermined value, an electrical discharge valve means disposed to be rendered conducting to connect the energizable means to a source of energy, means connected to the control means to be responsive to the operation of the control means to provide a source of direct-current biasing potential dependent upon the operation of the control means to render the electric discharge valve conducting under predetermined operating conditions of the control means to prevent a decrease in the excitation of the synchronous condenser below a predetermined value, a full-wave rectifier means connected in circuit relation with the power line to provide a source of direct-current voltage dependent upon the condenser current, and another electric discharge valve means disposed to connect the energizable means to another source of energy, said another valve having a grid connected in circuit relation with the full-wave rectifier means whereby said another valve is rendered conducting when the condenser current reaches its predetermined rated value to modify the energization of the energizable means and effect a decrease in the excitation of the synchronous condenser to maintain the condenser current at not more than the predetermined rated value.

JACK E. REILLY.

REFERENCES CITED

The following references are of record in the file of this patent:

UNITED STATES PATENTS

| Number | Name | Date |
|---|---|---|
| 1,993,924 | Espley | Mar. 12, 1935 |
| 2,195,120 | Moyer | Mar. 26, 1940 |
| 2,209,233 | Moyer | July 23, 1940 |
| 2,330,638 | Stratton | Sept. 28, 1943 |
| 2,371,030 | Crary | Mar. 6, 1945 |